United States Patent [19]

Bealkowski et al.

[11] Patent Number: 5,732,280
[45] Date of Patent: Mar. 24, 1998

[54] METHOD AND APPARATUS FOR DYNAMICALLY ASSIGNING PROGRAMMABLE OPTION SELECT IDENTIFIERS

[75] Inventors: Richard Bealkowski; Michael Robert Turner, both of Austin, Tex.

[73] Assignee: International Business Machines Corp., Armonk, N.Y.

[21] Appl. No.: 275,892

[22] Filed: Jul. 15, 1994

[51] Int. Cl.$^6$ .................................................. H01J 3/00
[52] U.S. Cl. .................... 395/828; 395/281; 395/282; 395/830; 395/835; 395/836; 395/700; 395/800; 395/821
[58] Field of Search .................... 395/822, 825, 395/281, 282, 283, 835, 828, 830, 800, 700, 829, 831, 834, 836, 882, 883, 884

[56] References Cited

U.S. PATENT DOCUMENTS

| | | |
|---|---|---|
| 4,015,244 | 3/1977 | Simpson . |
| 4,025,903 | 5/1977 | Kaufman et al. . |
| 4,354,258 | 10/1982 | Sato . |
| 4,360,870 | 11/1982 | McVey . |
| 4,373,181 | 2/1983 | Chisholm et al. . |
| 4,458,357 | 7/1984 | Weymouth et al. . |
| 4,571,676 | 2/1986 | Mantellina et al. . |
| 4,578,773 | 3/1986 | Desai et al. . |
| 4,604,690 | 8/1986 | Crabtree et al. . |
| 4,670,855 | 6/1987 | Caprio et al. . |
| 4,701,878 | 10/1987 | Gunkel et al. . |
| 4,760,533 | 7/1988 | Buckley et al. . |
| 4,984,213 | 1/1991 | Abdoo et al. . |
| 4,991,085 | 2/1991 | Pleva et al. . |
| 5,038,320 | 8/1991 | Heath et al. ............................ 395/830 |
| 5,313,592 | 5/1994 | Buondonno et al. . |
| 5,386,567 | 1/1995 | Lien et al. ............................. 395/700 |
| 5,446,869 | 8/1995 | Padgett et al. ........................ 395/500 |
| 5,491,804 | 2/1996 | Heath et al. .......................... 395/830 |
| 5,497,490 | 3/1996 | Harada et al. ........................ 395/700 |
| 5,517,646 | 5/1996 | Piccirillo et al. ...................... 395/700 |
| 5,524,269 | 6/1996 | Hamilton et al. ..................... 395/829 |
| 5,530,887 | 6/1996 | Harper et al. ......................... 395/800 |
| 5,553,245 | 9/1996 | Su et al. ................................ 395/284 |

OTHER PUBLICATIONS

Chin, A.L., et al., Function Signature Architecture For Personal Computer Systems, *IBM Technical Disclosure Bulletin*, 10–88, pp. 62–66, no date.

Heath, C.A., et al., Sub–Addressing Extension to Programmable Option Select, *IBM Technical Disclosure Bulletin*, 10–88, pp. 69–72, no date.

Lehman, C.T., Automatic Configuration of a Personal Computer System, *IBM Technical Disclosure Bulletin*, 09–89, pp. 112–115, No Date.

*Primary Examiner*—Raymond N. Phan
*Attorney, Agent, or Firm*—Andrew J. Dillon

[57] ABSTRACT

A method and apparatus for dynamically selecting adapter card identifiers within a computer system having expansion slots. Name strings used by the computer system, such as in a system using Micro Channel expansion slots, identify the installed adapter card. The method and apparatus distinguish automatically between adapter cards upon installation. This is accomplished by, responsive to identifying a newly installed adapter card, transforming the default POS name string to an alternate identifier. Next, additional random values are added to the transformed alternate identifier to increase identifier uniqueness. Then, portions of the name string are matched to a field within the alternate identifier, before storing the identifier, for allowing the computer to identify the correct alternate identifier matching the newly installed adapter card. The new identifier is stored in both the expansion slot addressing region and on the adapter card. Unique alternate identifiers for each adapter card are generated by comparing the new alternate identifier with any preexisting alternate identifiers and then adding more random values until the new alternate identifier is unique compared to the preexisting alternate identifiers. An adapter card is deinstalled or deconfigured before removal by resetting the alternate identifier to the original default POS name string and then removing the stored alternate identifier.

12 Claims, 4 Drawing Sheets

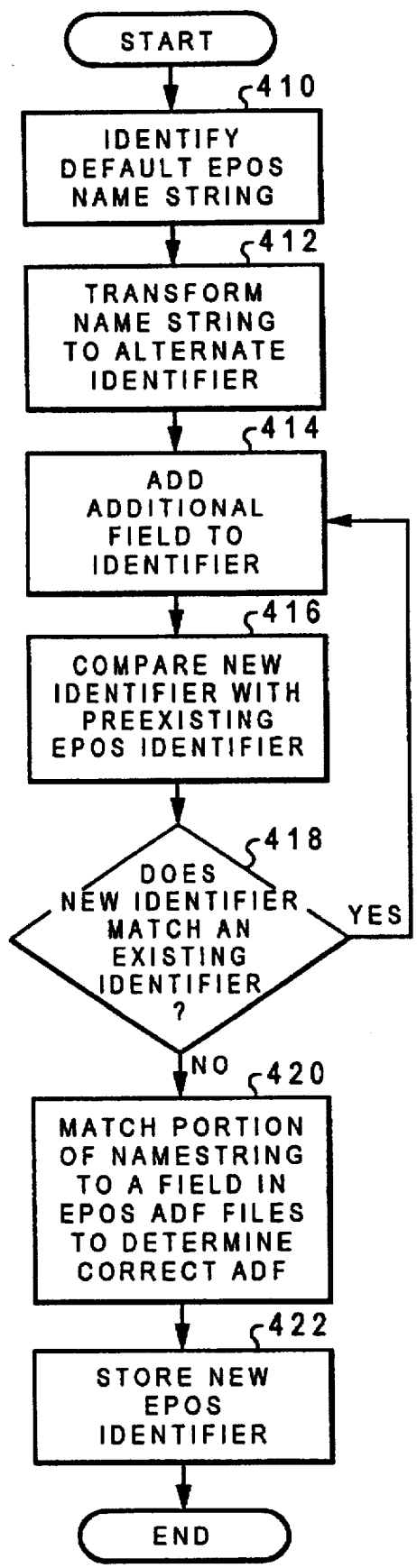
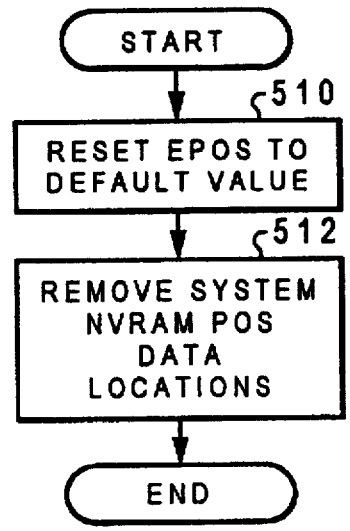
Fig. 5
Fig. 4

METHOD AND APPARATUS FOR DYNAMICALLY ASSIGNING PROGRAMMABLE OPTION SELECT IDENTIFIERS

BACKGROUND OF THE INVENTION

1. Technical Field

This invention relates generally to add on cards for personal computers, and specifically, to adapter cards for personal computers having automatic identification configuration mechanisms. More particularly, the invention relates to adapter cards in systems that reside in a Micro Channel slot using the programmable option selection in an extended embodiment for providing quick and accurate identification and configuration of the adapter cards with the system.

2. Description of the Related Art

Adapter cards used in the expansion slots in most personal computers are cumbersome and annoying to install since many times they compete with a limited number of switches already assigned within the computer system. Programmable option selection (POS) is a mechanism used in the PS/2 computer systems, manufactured by IBM, to identify and configure adapter cards and other subsystems through software. Previous mechanisms for configuring adapter cards and other subsystems included the use of mechanical switches. The PS/2 system abandoned the switches in favor of the POS.

Each adapter card in the system resides in a Micro Channel slot. POS is a subarchitecture of the overall Micro Channel architecture. A control register is used to place an individual slot into set up mode. In set up mode, the system has access to the POS registers of the adapter. The POS registers on the adapter are used to store programmable configuration information. When the computer system is first powered on, and after every Micro Channel reset, the power-on self test (POST) configures each adapter card. The POST retrieves the POS register values from the system nonvolatile random access memory (NVRAM). A set-up program, which operates as part of the system reference diskette, is used to establish the POS register values in the NVRAM.

The standard configuration process provides that the POST places a Micro Channel slot into set-up mode. Each slot is uniquely numbered. For each slot there are predetermined locations in NVRAM used to store the corresponding POS register data for that slot. NVRAM also contains the identifier of the adapter that is expected to be found in the slot. If the identifier read from the adapter card matches the identifier stored in the NVRAM, then the POS register data is loaded into the POS registers of the adapter. If the identifiers do not match, then an error is indicated. This procedure is repeated for each slot. The POS uses a subaddressing mechanism to extend the POS register space. For example, two POS registers are used as an index into a 128 kilobyte address space. Two other POS registers are defined to select data byte number two (2) and data byte number three (3) respectively. When the subaddress index is nonzero, the two POS registers access the location specified by the index.

The set-up program used to configure the system is found on a system reference diskette and requires an adapter description file (ADF) for each adapter present in the system. The set-up program associates an adapter with an ADF by the naming convention "@xxxx.ADF," where the "xxxx" is the four (4) digit adapter identifier. The ADF file describes to the set-up program what values are to be placed into the NVRAM to achieve a given computed configuration. This POS mechanism requires that each adapter card contains a distinct four hex digit adapter card identifier. The assignment of these identifiers must be done at a central location to make sure that each identifier for each type of adapter is unique. This registration of adapter card identifiers is cumbersome and restricts the user's ability to assign arbitrarily an adapter card to a particular slot.

Accordingly, what is needed is an expanded POS mechanism to provide for a more adaptive environment for the introduction of adapter cards into a computer system.

SUMMARY OF THE INVENTION

It is therefore one object of the present invention to provide add on cards for personal computers.

It is another object of the present invention to provide adapter cards for personal computers having automatic identification configuration mechanisms.

It is yet another object of the present invention to provide adapter cards in systems that reside in a Micro Channel or PCI slot using the programmable option selection in an extended embodiment for providing quick and accurate identification and configuration of the adapter cards with the system.

The foregoing objects are achieved as is now described. According to the present invention, a method and apparatus for dynamically selecting adapter card identifier within a computer system having expansion slots is disclosed. The computer system expansion slots receive the adapter cards, which each has a default programmable option selection (POS) name string. The name string is used by the computer system, such as in a system using Micro Channel expansion slots, to identify the installed adapter card. The expansion slots may alternatively be Peripheral Component Interconnect (PCI) expansion slots. The method and apparatus is able to distinguish automatically between adapter cards upon installation. This is accomplished by, responsive to identifying a newly installed adapter card, transforming the default POS name string to an alternate identifier. Next, additional random values are added to the transformed alternate identifier to increase identifier uniqueness. Then, portions of the name string are matched to a field within the alternate identifier, before storing the identifier, for allowing the computer to identify the correct alternate identifier matching the newly installed adapter card. The new identifier is stored in both the expansion slot addressing region and on the adapter card.

Unique alternate identifiers for each adapter card are generated by comparing the new alternate identifier with any preexisting alternate identifiers and then, in response to finding a preexisting alternate identifier matching the new alternate identifier, adding more random values until the new alternate identifier is unique compared to the preexisting alternate identifiers.

The method and apparatus must be able to deinstall or deconfigure the adapter card before removal. This is accomplished by resetting the alternate identifier to the original default POS name string and then removing the stored alternate identifier.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a flowchart of the steps used to implement the EPOS of FIG. 3;

FIG. 5 depicts a flowchart of the steps used to deconfigure an adapter card according to the present invention.

DETAILED DESCRIPTION OF PREFERRED EMBODIMENT

Figure 1:
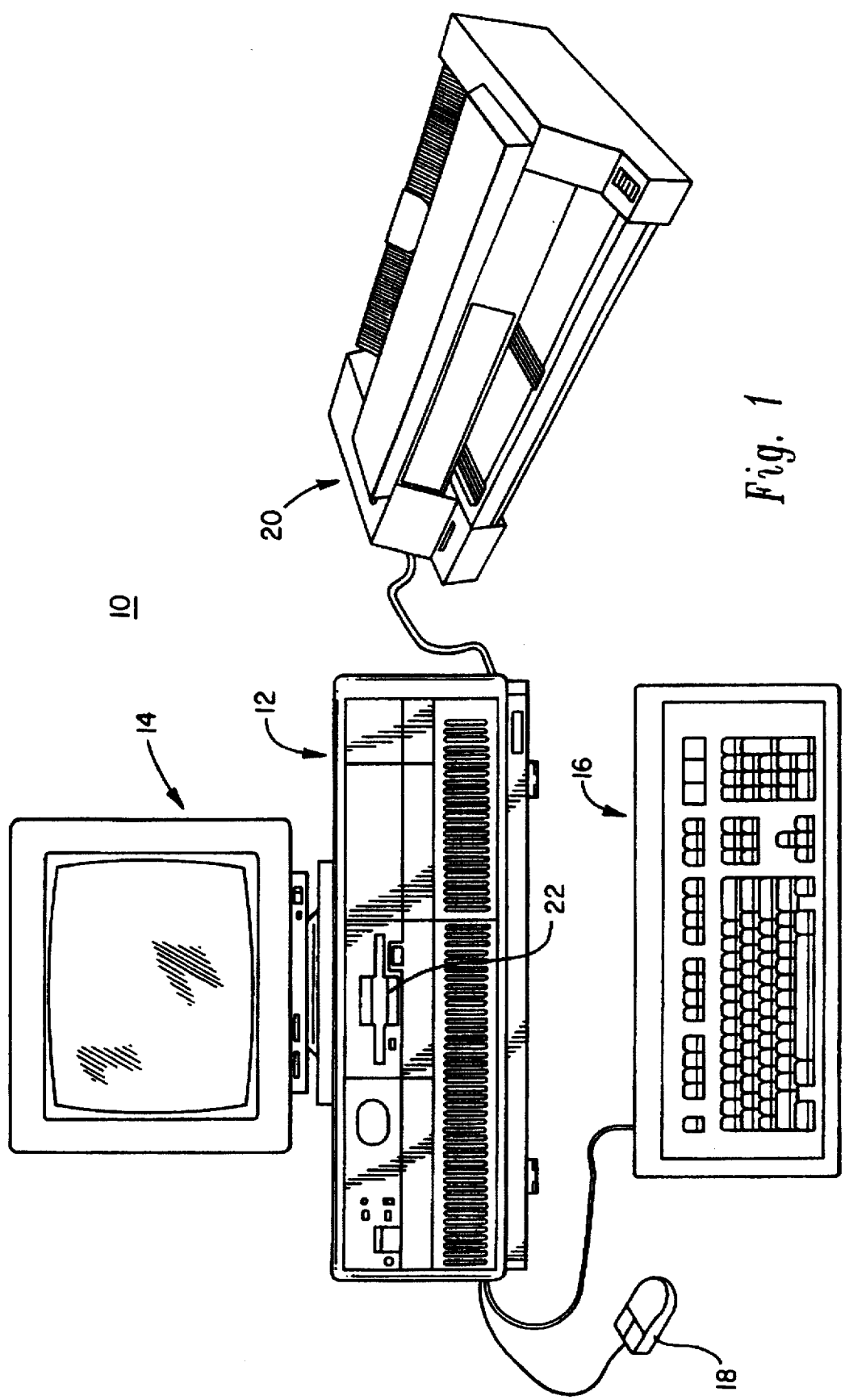
FIG. 1 depicts a data processing system in the form of a personal computer in which the present invention can be employed is depicted.

Referring now to the figures, and in particular to FIG. 1, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, interfaces (not shown). Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
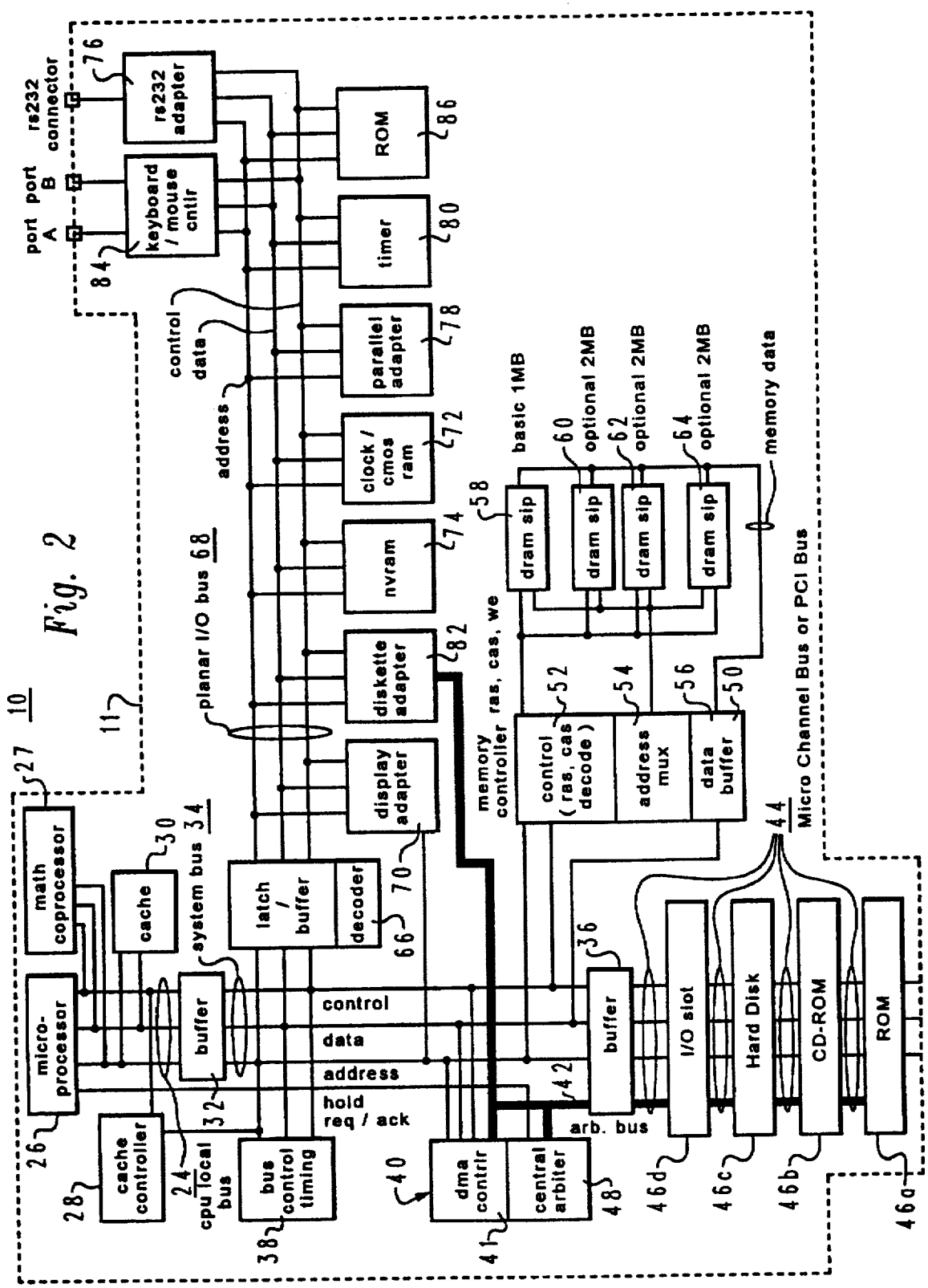
FIG. 2 is a block diagram of a personal computer system illustrating the various components of personal computer system in accordance with the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Instead of Micro Channel slots, the invention also contemplates using Peripheral Component Interconnect (PCI) slots and bus established by Intel Corp. and managed and maintained by the PCI Special Interest Group of Hillsboro, Oreg. Connected to bus 44 are a plurality of I/O slots 46a–46d for receiving Micro Channel adapter cards, which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Additionally, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Figure 3:
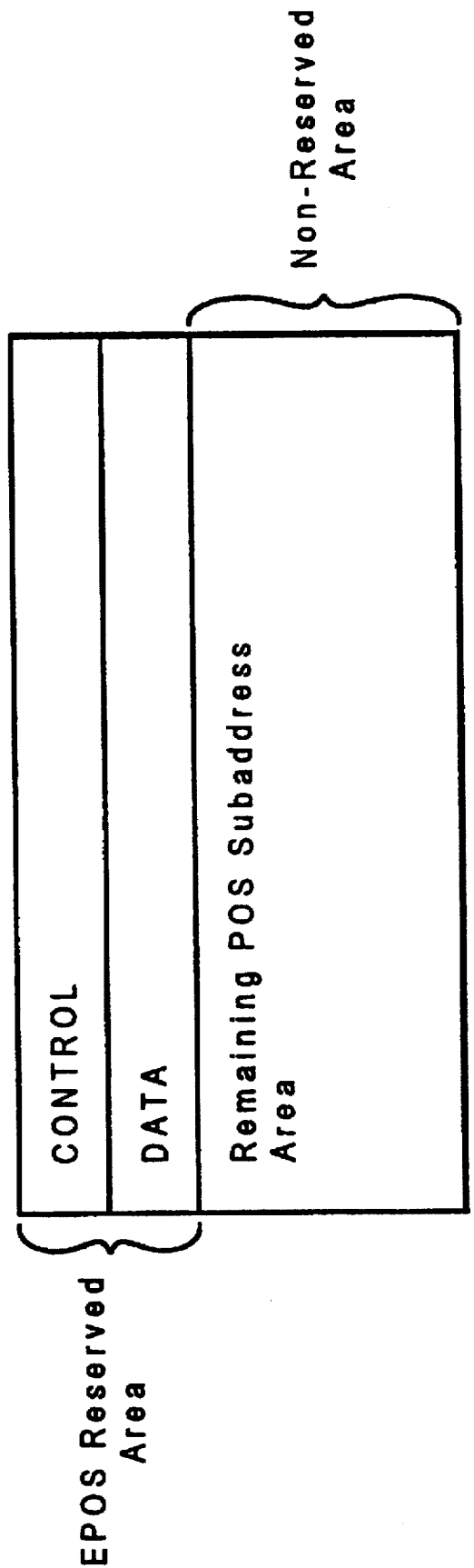
FIG. 3 depicts an expanded programmable option selection (EPOS) according to the present invention.

The Micro Channel bus adapter slots 46 normally use the programmable option select (POS) to identify and configure adapter cards and other subsystems through software. The present invention uses an enhanced POS, or EPOS, to simplify the process and overcome some of the problems inherent in the current POS design. FIG. 3 depicts a block diagram of the EPOS. First, an area of subaddress space is reserved for the EPOS. The reserved subaddress area for the EPOS contains both control and data locations. The EPOS reserved area data contains a null terminated string. The structure of the string can be defined in such a way as to ensure vendor unique identification. For example, all adapters used for IBM systems can begin with the name string with the letters "T" "B" "M." This naming convention places the responsibility of creating a unique name string on each of the adapter vendors, thus freeing them of any registration requirements. This name string can be further defined to contain a plurality of fields, each field providing additional description information. For example, a field can be defined that specifies an adapter card type such as, for example, "video" or "network."

TABLE 1

| Index Offset | Name | Description |
| --- | --- | --- |
| 0 | POS Register 0 | Adapter Identification Byte (Low Byte) |
| 1 | POS Register 1 | Adapter Identification Byte (High Byte) |

TABLE 1-continued

| Index Offset | Name | Description |
| --- | --- | --- |
| 2 | POS Register 2 | Option Select Data Byte 1 |
| 3 | POS Register 3 | Option Select Data Byte 2 |
| 4 | POS Register 4 | Option Select Data Byte 3 |
| 5 | POS Register 5 | Option Select Data Byte 4 |
| 6 | POS Register 6 | Subaddress Extension (Low Byte) |
| 7 | POS Register 7 | Subaddress Extension (High Byte) |

Table 1 outlines the index offset with its corresponding programmable option select register description. There are eight POS registers, 0-7. The POS subaddressing is used to extend the POS register space. POS registers 6 and 7 are used as an index into a 128 kilobyte address space. When the subaddress index is zero, POS Registers 3 and 4 are defined as option select data byte two and option select data byte three, respectively. When the subaddress index is nonzero, POS Registers 3 and 4 access the location specified by the index. The definition of the POS identifier returned through POS Register 0 and POS Register 1 is expanded under EPOS. Existing adapters and their identifiers continue to operate as before. EPOS enabled adapters support an identifier that can be changed within the adapter and the adapter contains that change in a local nonvolatile memory.

An EPOS adapter, which has not been configured, has an initial default identifier. This default identifier can be any currently unused value, typically a four digit hex number. For example, the value "BACE" can be chosen as the default identifier. A configured EPOS adapter is then programmed with a new EPOS identifier. This new EPOS identifier then corresponds to the slot number in which the adapter is installed. Under software control, such as the reference diskette program, the manipulation of bits within the control field of the EPOS reserved area are used to force the adapter card to present its default identifier. This then enables the software to distinguish an EPOS adapter.

The procedure used to set-up and define an EPOS adapter card is depicted in FIG. 4. During adapter card or sub assembly set-up, the set-up program identifies the default name string in block 410 and then hashes the name string of the EPOS adapter into an EPOS (ADF) filename such as, for example, "xxxx.ADF" according to block 412. Hashing is the process by which one or more fields are transformed into a different, usually more compact, arrangement. To enhance further the EPOS identifier generation process, additional fields are included in block 414 during the hash computation. The fields added contain pseudo-random values, such as, time, date, timer ticks, or other suitable values. It is the unique "stamp" of these additional fields that creates an EPOS identifier and that ensures an identifier mismatch if, for example, the adapter has moved within the system or is installed into a different system. For example, an adapter card that is to be moved from slot two of computer A to slot two of computer B. An EPOS adapter currently resides in slot two of computer B, so it is removed. The EPOS adapter from computer A is installed in slot two of computer B. The hashed EPOS identifier does not match the stored identifier and system NVRAM of computer B due to the "random" nature of the hashed EPOS identifier. A simple, slot-based identifier scheme would introduce system configuration problems since the identifiers would match even though the adapter was of a different type.

After the name string has been modified, the new EPOS identifier is checked against existing EPOS identifiers to prevent a conflict as shown in blocks 416 and 418. Conflicts are resolved by regenerating the EPOS identifier off of a new set of pseudo-random values. The set-up then matches a portion of the name string to a field within the EPOS ADF files to determine the correct ADF for a particular adapter as Shown in block 420. The file name conventioned for EPOS ADF files is based on a hash of the name string using no randomness or a known set of seeds. If a name string mismatch occurs, it would be resolved through the rehashing with an alternate seed to enable set-up to determine the correct EPOS ADF file. Once a new EPOS identifier is generated, it is stored in block 422 for access during POST. The name string provided by the EPOS adapter enables the system to identify an adapter in an alternative way. Furthermore, the dynamically generated EPOS identifier eliminates the POS identifier registration restriction.

One benefit of the new EPOS system, is that identification of EPOS adapters is no longer done through the adapter identifier, since it is a dynamically generated value. To determine the exact nature of the adapter card, the name string contained in the EPOS reserved area must be queried. The name string and any associated subfields contain much more information than the four hex digit identifier of the standard POS system.

The system POST is also modified to support EPOS. When POST attempts to determine adapter type in a system that has configuration errors, POST will not be able to rely on the regular POS identifier alone. The POST will then recognize EPOS adapters and retrieve the name string and decode the name string to determine if its search criteria is met. Once the system is configured, POST operates as in the regular POS environment.

Since the system now configures the EPOS adapters, each adapter must be deconfigured upon removal from the system. A removal utility, which is placed in the reference diskette, is used before an adapter is removed from the system. This utility, which is shown in FIG. 5, prepares the adapter for removal by resetting its EPOS identifier to the default value in block 510 and clearing the corresponding system NVRAM POS in block 512. This utility also provides a method for orderly shutting down a system for reconfiguration. In cases when orderly reconfiguration cannot be accomplished, a hardware mechanism is implemented for automatically resetting the EPOS identifier upon the removal of the adapter from the system. A stored power source, such as a battery or long term capacitor, can trigger the identifier reset once a Micro Channel connector pin, such as a ground pin, is disconnected. This disconnection occurs upon the removal of the adapter card from the Micro Channel slot.

While the invention has been particularly shown and described with reference to a preferred embodiment, it will be understood by those skilled in the art that various changes in form and detail may be made therein without departing from the spirit and scope of the invention.

What is claimed is:

1. In a computer system having expansion slots, in which are placed adapter cards each having a particular default programmable option selection name string corresponding thereto, a method for automatically distinguishing between said adapter cards upon installation in said computer system, comprising the steps of:

responsive to identifying a newly installed adapter card in an expansion slot, transforming said particular default programmable option selection name string to an alternate identifier;

adding additional random values to said alternate identifier;

correlating a portion of said particular default programmable option selection name string to a field within said alternate identifier for identifying said alternate identifier as corresponding to said particular default programmable option selection name string.

2. A method according to claim 1 wherein said step of adding additional random values further includes the steps of:

comparing said alternate identifier with any other alternate identifiers;

responsive to finding an other alternate identifier matching said alternate identifier adding more random values until said alternate identifier is unique compared to said other alternate identifiers.

3. A method according to claim 1 further comprising the step of storing said alternate identifier for access by said computer system during initial system configuration.

4. A method according to claim 3 further comprising the steps of:

responsive to a request to remove said adapter card, resetting said alternate identifier to said particular default programmable option selection name string;

removing said stored alternate identifier.

5. In a computer system having expansion slots, in which are placed adapter cards each having a particular default programmable option selection name string corresponding thereto, an apparatus for automatically distinguishing between said adapter cards upon installation, comprising:

means, responsive to identifying a newly installed adapter card in an expansion slot, and coupled to said expansion slots, for transforming said particular default programmable option selection name string to an alternate identifier;

means, coupled to said transforming means, for adding additional random values to said alternate identifier; and means, coupled to said adding means, for correlating a portion of said particular default programmable option selection name string to a field within said alternate identifier for identifying said alternate identifier as corresponding to said particular default programmable option selection name string.

6. The apparatus according to claim 5 wherein said means of adding additional random values further includes:

means for comparing said alternate identifier with any preexisting alternate identifiers; and responsive to finding a preexisting alternate identifier matching said alternate identifier means, coupled to said comparing means, for adding more random values until said alternate identifier is unique compared to said preexisting alternate identifiers.

7. The apparatus according to claim 5 further comprising means, coupled to said computer system, for storing said alternate identifier for access by said computer system during initial system configuration.

8. The apparatus according to claim 7 further comprising: responsive to a request to remove said adapter card, means, coupled to said computer system, for resetting said alternate identifier to said default position option select name string; and means, coupled to said resetting means and said computer system, for removing said stored alternate identifier.

9. The apparatus of claim 5 wherein said expansion slots are Micro Channel compatible.

10. The apparatus of claim 5 wherein said expansion slots are Peripheral Connect Interface (PCI) compatible.

11. A method for automatically distinguishing between adapter cards upon installation in expansion slots in a computer system, said adapter cards each having a default name string stored therein, comprising the steps of:

detecting a newly-installed adapter card in an expansion slot;

retrieving said default name string from said adapter card;

transforming said default name string to an alternate identifier;

adding additional random values to said transformed alternate identifier; and correlating a portion of said default name string to a field within said alternate identifier.

12. A method according to claim 11 wherein said step of adding additional random values further includes the steps of:

comparing said alternate identifier with any other alternate identifiers;

responsive to finding an other alternate identifier matching said alternate identifier, adding more random values until said alternate identifier is unique compared to said other alternate identifiers.

* * * * *